(12) United States Patent
Meyer et al.

(10) Patent No.: US 8,480,846 B2
(45) Date of Patent: Jul. 9, 2013

(54) SILICA AND ALSO EPOXY RESINS

(75) Inventors: Juergen Meyer, Stockstadt (DE); Mario Scholz, Gruendau (DE); Pia Buckel, Bruchkoebel (DE); Andreas Hille, Loerrach (DE)

(73) Assignee: Evonik Degussa GmbH, Essen (DE)

( * ) Notice: Subject to any disclaimer, the term of this patent is extended or adjusted under 35 U.S.C. 154(b) by 168 days.

(21) Appl. No.: 12/812,554

(22) PCT Filed: Feb. 10, 2009

(86) PCT No.: PCT/EP2009/051475
§ 371 (c)(1),
(2), (4) Date: Jul. 12, 2010

(87) PCT Pub. No.: WO2009/109442
PCT Pub. Date: Sep. 11, 2009

(65) Prior Publication Data
US 2010/0286311 A1    Nov. 11, 2010

(30) Foreign Application Priority Data
Mar. 4, 2008 (DE) .......................... 10 2008 000 499

(51) Int. Cl.
C09J 163/00 (2006.01)
C01B 33/18 (2006.01)
B32B 1/00 (2006.01)
C08L 63/00 (2006.01)
C08K 3/36 (2006.01)

(52) U.S. Cl.
USPC ........... 156/330; 423/335; 423/337; 427/215; 427/387; 427/427.4; 428/405; 523/443; 523/466

(58) Field of Classification Search
USPC .................. 423/335, 337; 427/212, 213.31, 427/213.32, 215, 218, 219, 387, 421.1, 427.4; 428/402, 403, 404, 405, 407; 523/440, 443, 523/466; 156/330
See application file for complete search history.

(56) References Cited

U.S. PATENT DOCUMENTS

| | | | | |
|---|---|---|---|---|
| 3,592,679 A * | 7/1971 | Tully et al. | ..................... | 428/206 |
| 4,852,965 A * | 8/1989 | Mullin et al. | ................. | 385/101 |
| 5,285,513 A * | 2/1994 | Kaufman et al. | ............. | 385/109 |
| 5,543,487 A * | 8/1996 | Vick et al. | ..................... | 528/158 |
| 6,645,341 B1 | 11/2003 | Gordon | | |
| 7,439,298 B2 * | 10/2008 | Schumacher et al. | ........ | 524/588 |
| 7,491,375 B2 * | 2/2009 | Schumacher et al. | ........ | 423/335 |
| 2003/0138715 A1 | 7/2003 | Barthel et al. | | |
| 2003/0144404 A1 | 7/2003 | Schachtely et al. | | |
| 2004/0121156 A1 * | 6/2004 | Meyer et al. | ................... | 428/403 |
| 2004/0127604 A1 * | 7/2004 | Meyer et al. | ................... | 523/216 |
| 2004/0131527 A1 | 7/2004 | Gottschalk-Gaudig et al. | | |
| 2006/0155042 A1 | 7/2006 | Schumacher et al. | | |
| 2006/0155052 A1 * | 7/2006 | Schumacher et al. | ........ | 524/588 |

FOREIGN PATENT DOCUMENTS

| | | |
|---|---|---|
| DE | 102 22 153 | 12/2003 |
| DE | 10 2005 035 442 | 5/2007 |
| EP | 1 281 735 | 2/2003 |
| EP | 1 302 444 | 4/2003 |
| EP | 1 433 749 | 6/2004 |
| EP | 1 681 266 | 7/2006 |
| FR | 1 270 320 | 8/1961 |
| GB | 1184094 A * | 3/1970 |

OTHER PUBLICATIONS

Machine translation of DE 10222153 A1, provided by the EPO website (no date).*
Machine translation of FR 1270320 A, provided by the EPO website (no date).*
Machine translation of DE 102005035442 A1, provided by the EPO website (no date).*
"Ulimann's Encyclopedia of Industrial Chemistry" 5th Ed., Silica, Refractory Ceramics to Silicon Carbide, VCH Verlagsgesellschaft, vol. A23, pp. 635-641 (1993) ISBN 3-527 020123-8.
"CAB-O-SIL® Untreated Fumed Silica—Properties & Functions" Company Literature. Cabot Corp., 2001 URL:http://www.cabot-corp.com. (retrieved on Aug. 27, 2002) pp. 3-5.
European Search Report issued Apr. 16, 2012, in Patent Application No. 11 18 9483.

* cited by examiner

*Primary Examiner* — Michael J Feely
(74) *Attorney, Agent, or Firm* — Oblon, Spivak, McClelland, Maier & Neustadt, L.L.P.

(57) ABSTRACT

Fumed silicon dioxide powder in the form of aggregated primary particles having a BET surface area of $175\pm15$ m$^2$/g and a thickening effect, based on the BET surface area, of greater than 18 mPas g/m$^2$ is hydrophobicized with polydimethylsiloxane. This hydrophobic fumed silica has a BET surface area of $110\pm25$ m$^2$/g. It can be used in epoxy resins. These epoxy resins in turn can be used as adhesives.

10 Claims, No Drawings

SILICA AND ALSO EPOXY RESINS

The invention relates to a hydrophilic and also to a hydrophobic, fumed (i.e. pyrogenically prepared) silica, to a process for preparing it and to epoxy resins which comprise these silicas.

Fumed silicas are known from Ullmann's Encyclopädie der technischen Chemie, Volume 21, pages 464 ff, 4th edition (1982).

They are prepared by flame hydrolysis of vaporizable, halogen-containing silanes, such as $SiCl_4$ or methyltrichlorosilane, for example, in an oxyhydrogen flame (high-temperature flame hydrolysis).

The flame hydrolysis for the preparation of silicon dioxide is a long-established process which is practised industrially. In this process a vaporized or gaseous hydrolysable silicon halide is combined with a flame formed by combustion of a water-forming, hydrogen-containing fuel and an oxygen-containing gas. This combustion flame provides water for the hydrolysis of the silicon halide and sufficient heat for the hydrolysis reaction. The silicon dioxide powder entrained in the residual gases of the reaction is subjected to conventional cooling and solids separation procedures. Commonly silicon tetrachloride is used. Also known, however, is the use of dichlorosilane or trichlorosilane. Where carbon-containing feedstocks are employed, such as methyltrichlorosilane, dimethyldichlorosilane, methyldichlorosilane, dibutyldichlorosilane, ethyltrichlorosilane and propyltrichlorosilane, for example, there is also an oxidation operation for converting the carbon to carbon dioxide.

Below, a silicon dioxide powder formed in a process wherein the types of reaction occurring are flame hydrolysis or oxidation, or the combination of both, will be referred to as a fumed silicon dioxide.

In the course of the reaction, first of all, highly disperse, non-porous primary particles are formed, which in the further course of the reaction grow together to form aggregates, which may undergo further accretion to form agglomerates. The BET surface area of these primary particles is generally between 5 and 600 $m^2/g$. The powder has free hydroxyl groups on its surface.

The silicon dioxide powder thus prepared finds use in many areas of application, for example as a thickener in polymers, in polyester resins, for example.

The object of the invention is therefore to provide a silicon dioxide powder which exhibits a high thickening action at a BET surface area of 175±15 $m^2/g$.

A further object of the invention is to provide a process for preparing the silicon dioxide powder.

The invention provides a fumed silicon dioxide powder in the form of aggregates of primary particles which possess a BET surface area of 175±15 $m^2/g$ and also a thickening effect, based on the BET surface area, of greater than 18 mPas·g/$m^2$.

The BET surface area may be preferably 175±10 $m^2/g$ and more preferably 175±5 $m^2/g$.

Preference may additionally be given to a fumed silicon dioxide powder of the invention wherein the chloride content is less than 250 ppm. A chloride content of less than 150 ppm is particularly preferred.

Preference may additionally be given to a fumed silicon dioxide powder of the invention wherein the carbon content is less than 100 ppm. A carbon content of less than 25 ppm is particularly preferred.

The silicon dioxide powder of the invention, at a concentration of 2.0% by weight in a polyester resin in solution in styrene, with an initial viscosity of 1300±100 mPas (23° C.), is able to bring about thickening of greater than 3400 mPas.

The invention further provides a process for preparing the silicon dioxide powder of the invention, wherein
a silicon compound ($SiCl_4$) is vaporized and the vapour is transferred, by means of a carrier gas if desired, into a mixing chamber,
and, separately, a fuel gas, primary air, which if desired may have been preheated and/or enriched with oxygen, is transferred into the mixing chamber,
the mixture comprising the silicon chlorides' vapour, fuel gas and primary air is ignited in a burner and the flame is burnt into a reaction chamber,
secondary air surrounding the flame is introduced into the reaction chamber, the secondary air/primary air ratio being situated within a range from 0.05 to 3, preferably 0.15 to 2, and
then the solid is separated from gaseous substances, and thereafter the solid is treated with steam at 250° C. to 750° C.,
the total amount of oxygen being at least sufficient for the complete combustion of the fuel gas and the silicon compounds, and
the amount of the primary feedstocks, comprising silicon compounds, fuel gas and primary air, being selected such as to result in an adiabatic flame temperature $T_{ad}$ of 1840 to 1900° C., where
$T_{ad}$=temperature of feedstocks+sum of the reaction enthalpies of the sub-reactions/heat capacity of the substances which depart from the reaction chamber, comprising silicon dioxide, water, hydrogen chloride, carbon dioxide, oxygen, nitrogen and, where appropriate, a carrier gas, if the latter is not air or nitrogen,
on the basis of the specific heat capacity of these substances at 1000° C.

The specific heat capacities can be determined, for example, with the aid of the VDI Warmeatlas (sections 7.1 to 7.3 and 3.7, 8th edition).

The reaction of the silicon compound in the presence of oxygen and a fuel gas yields silicon dioxide, water, hydrochloric acid and, in the case of carbon-containing fuel gases, carbon dioxide. The reaction enthalpies of these reactions can be calculated by means of standard works that are known to the person skilled in the art.

Suitable fuel gases are hydrogen, methane, ethane, propane, and/or natural gas, with hydrogen being preferred.

There is no limit on the temperature of the feedstocks, provided that it is above the boiling temperature of the highest-boiling silicon compound. A feedstock temperature of 90° C.±40° C. has proved to be advantageous.

It may further be of advantage if the exit rate of the reaction mixture from the mixing chamber into the reaction chamber is 10 to 80 m/s.

The use of fumed silicas hydrophobicized with silicone oil in epoxy resins is known. A disadvantage of the known hydrophobic fumed silicas is that the viscosity they set is too low.

It is a further object of the invention to prepare a hydrophobic fumed silica which does not have these disadvantages.

The invention further provides a hydrophobic fumed silica which is characterized in that it has been hydrophobicized with dimethylsiloxane and has a BET surface area of 110±25 $m^2/g$.

The silica of the invention may additionally have an average aggregate surface area of 53 257±500 $nm^2$.

The average aggregate circumference may be 3605±500 nm.

The average maximum aggregate diameter may be 394±5 nm.

The average minimum aggregate diameter may be 242±5 nm.

The average primary particle diameter may be 18±5 nm.

The invention further provides a process for preparing the hydrophobic fumed silica of the invention, which is characterized in that the hydrophilic fumed silica having a BET surface area of 175±15 m²/g is sprayed with polydimethylsiloxane, followed by mixing and then heat treatment for 1 to 6 hours.

The invention further provides epoxy resins which comprise the hydrophobic fumed silicas of the invention.

The hydrophobic fumed silicon dioxide of the invention produces a super-proportionally increased thickening in epoxy resin. The epoxy resin is therefore suitable for use as an adhesive.

The invention further provides adhesives which comprise silanized fumed silicas of the invention and are based on epoxy resins.

The invention further provides for the use of silanized fumed silicas in adhesives.

An adhesive is defined as a non-metallic material which is able to join adherends by surface adhesion and internal strength. In the prior art there are numerous different adhesives known, the great majority of the adhesives used having a composition based on organic compounds. A distinction is made essentially between physically setting adhesives and chemically curing adhesives. The physically setting adhesives are those in which the final adhesive substance, frequently a polymer, is used as it is and then a physical process causes the adhesive to solidify.

Known accordingly, for example, are hotmelt adhesives, dispersion-based adhesives, wet adhesives containing organic solvents, and contact adhesives. A feature common to all of these types of adhesive is that first the adhesive is applied in a processable form and then solidification occurs as a result, for example, of evaporation of the solvent or of cooling.

In the case of the chemically curing adhesives, individual building blocks are applied and subsequently, by means of a chemical reaction of the individual building blocks, a new product is formed and undergoes solidification. Among the reactive adhesives a distinction is made between 2-component and 1-component systems. In the case of the 2-component systems, the adhesives are applied from separate constituents and solidify through a chemical reaction. In the case of 1-component adhesives, the adhesive cures in a chemical reaction, as a result of a change in the ambient conditions—for example, temperature increase, ingress of air, evaporation, moisture or atmospheric oxygen.

The group of the chemically curing adhesives includes, for example, cyanoacrylate adhesives, methyl methacrylate adhesives, anaerobically curing adhesives, radiation-curing adhesives, phenol-formaldehyde resin adhesives, silicones, silane-crosslinked polymer adhesives, polyimide adhesives, epoxy resin adhesives and polyurethane adhesives. An overview of the various adhesives can be found in Ullmann's Enzyklopädie der Chemie, 4th edition, volume 14, page 227 ff. (1997).

Also known is the use of different additives in adhesives; among others, for example, pyrogenic (fumed) silicas, which are effective thixotropic agents, are used in adhesives based on epoxy resins (Degussa Pigments brochure series (2001) Nos. 27 and 54).

Pyrogenically prepared silicas possessing silanized surfaces are known from the prior art. EP 0 672 731 A1 describes silanized silicas.

A disadvantage associated with the use of such silicas is that their thickening effect is low and they must therefore be used at a relatively high concentration.

Furthermore, these silicas lose their thickening performance, undesirably, over the storage time.

The technical problem addressed by the invention is therefore that of providing adhesives into which a silanized fumed silica is incorporated, for the purpose of improving the rheological properties, with thickening of the adhesive occurring, and with the adhesive remaining processable.

This technical problem is solved inventively by means of an adhesive which comprises silanized pyrogenically prepared silicas containing hydrophobic groups fixed on their surface. They can have the following physicochemical properties:

| | |
|---|---|
| BET surface area m²/g: | 25-400 |
| Average primary particle size nm: | 5-50 |
| pH: | 3-10 |
| Carbon content %: | 0.1-10 |
| DBP number %: | <200 or undeterminable |

Silanized silicas are known from the prior-art DE 102 39 424 A1, where they are used in coating materials in order to improve the scratch resistance of the coating's surface. EP 0 672 731 A1 likewise discloses silanized pyrogenic silicas, which are used as thickeners for coating materials and resins.

It was surprisingly observed that the silanized pyrogenically prepared silicas according to the invention, in adhesives, contrary to the prior art described in EP 0 672 731 A1, produce a marked improvement in the thickening effect, in association with an improved storage stability.

TABLE 1

Properties of pyrogenic silicas prior to silanization

| | | Aerosil 90 | Aerosil 130 | Aerosil 150 | Aerosil 200 | Aerosil 300 | Aerosil 380 | Aerosil OX 50 | Aerosil TT 600 |
|---|---|---|---|---|---|---|---|---|---|
| Attitude towards water | | | | | Hydrophilic | | | | |
| Appearance | | | | | loose white powder | | | | |
| BET surface area [1]) | m²/g | 90 ± 15 | 130 ± 25 | 150 ± 15 | 200 ± 25 | 300 ± 30 | 380 ± 30 | 50 ± 15 | 200 ± 50 |
| Average primary particle size | nm | 20 | 16 | 14 | 12 | 7 | 7 | 40 | 40 |
| Tapped density [2]) | | | | | | | | | |
| normal product | g/l | about 80 | about 50 | about 50 | about 50 | about 50 | about 50 | about 130 | about 60 |
| compacted product (suffix "V") | g/l | — | about 120 | about 120 | about 120 | about 120 | about 120 | — | — |
| Loss on drying [3]) (2 hours at 1000° C.) on leaving the supply plant | % | <1.0 | <1.5 | <0.5 [9]) | <1.5 | <1.5 | <1.5 | <1.5 | <2.5 |

TABLE 1-continued

Properties of pyrogenic silicas prior to silanization

|  |  | Aerosil 90 | Aerosil 130 | Aerosil 150 | Aerosil 200 | Aerosil 300 | Aerosil 380 | Aerosil OX 50 | Aerosil TT 600 |
|---|---|---|---|---|---|---|---|---|---|
| Loss on ignition [4]) [7]) (2 hours at 1000° C.) | % | <1 | <1 | <1 | <1 | <2 | <2.5 | <1 | <2.5 |
| pH [5]) (in 4% aqueous dispersion) |  | 3.6-4.5 | 3.6-4.3 | 3.6-4.3 | 3.6-4.3 | 3.6-4.3 | 3.6-4.3 | 3.8-4.8 | 3.6-4.5 |
| $SiO_2$ [8]) | % | >99.8 | >99.8 | >99.8 | >99.8 | >99.8 | >99.8 | >99.8 | >99.8 |
| $Al_2O_3$ [8]) | % | <0.05 | <0.05 | <0.05 | <0.05 | <0.05 | <0.05 | <0.08 | <0.05 |
| $Fe_2O_3$ [8]) | % | <0.003 | <0.003 | <0.003 | <0.003 | <0.003 | <0.003 | <0.01 | <0.003 |
| $TiO_2$ [8]) | % | <0.03 | <0.03 | <0.03 | <0.03 | <0.03 | <0.03 | <0.03 | <0.03 |
| HCl [8]) [9]) | % | <0.025 | <0.025 | <0.025 | <0.025 | <0.025 | <0.025 | <0.025 | <0.025 |
| Sieve residue [6]) (Mocker method, 45 μm) | % | <0.05 | <0.05 | <0.05 | <0.05 | <0.05 | <0.05 | <0.2 | <0.05 |

[1]) DIN 66131
[2]) DIN ISO 787/XI, JIS K 5101/18 (unsieved)
[3]) DIN ISO 787/II, ASTM D 280, JIS K 5101/21
[4]) DIN 55 921, ASTM D 1208, JIS K 5101/23
[5]) DIN ISO 787/IX, ASTM D 1208, JIS K 5101/24
[6]) DIN ISO 787/XVIII, JIS K 5101/20
[7]) based on the substance dried at 105° C. for 2 hours
[8]) based on the substance calcined at 1000° C. for 2 hours
[9]) HCl content is a constituent of the loss on ignition In one preferred embodiment the adhesive comprises as its base polymer compounds selected from the group consisting of epoxy resins, unsaturated polyester resins, polyurethane, silane-terminated polymers, vinyl ester resins, acrylates, polyvinyl acetate, polyvinyl alcohol, polyvinyl ethers, ethylene-vinyl acetate, ethylene-acrylic acid copolymers, polyvinyl acetates, polystyrene, polyvinyl chloride, styrene-butadiene rubber, chloroprene rubber, nitrile rubber, butyl rubber, polysulphide, polyethylene, polypropylene, fluorinated hydrocarbons, polyamides, saturated polyesters and copolyesters, phenol-formaldehyde resins, cresol-/resorcinol-formaldehyde resins, urea-formaldehyde resins, melamine-formaldehyde resins, polyimides, polybenzimidazoles, polysulphones or mixtures thereof.

In one preferred embodiment the silanized, pyrogenically prepared silica can also be introduced into an epoxy resin, with this resin then being admixed to the adhesive.

Adhesives are products which, in accordance with their respective chemical composition and the physical state prevailing at the time of application to the adherends, allow wetting of the surfaces and, in their bonded joint, form the adhesive layer needed for the transmission of force between the adherends. Like sealants, adhesives comprise similar components in addition to the base polymer, such as, for example, solvents (ketones for example), water, fillers (chalk for example), thixotropic agents (pyrogenic silica for example), adhesion promoters (silanes for example), colour pastes (pigment-grade carbon black for example) and also further additives (for example, catalysts, ageing inhibitors).

In comparison to sealants, adhesives have higher tensile shear strengths and lower extension values; in other words, adhesives are hard to elastic, and sealants are elastic to plastic.

Epoxy resins are used preferably as base polymers for adhesives. Epoxy resins are prepared for example by condensing 2,2-bis(4-hydroxyphenyl)propane and epichlorohydrin in a basic medium. Depending on the equivalents of both reactants that are employed, the products are glycidyl ethers with different molar masses. In recent years, epoxy resins from bisphenol F, novolak epoxy resins, and cycloaliphatic and heterocyclic epoxy resins have also acquired importance.

Since epoxy resins on their own are poor film-formers, molecular enlargement is required by means of suitable crosslinking agents. Examples of crosslinking agents used for epoxy resins include polyamines, polyaminoamides, carboxylic anhydrides and dicyandiamides. Among the amine curing agents a distinction is made between aliphatic, cycloaliphatic, aromatic and araliphatic polyamines. Curing takes place without elimination of reaction products. It generally involves the addition of a reactive hydrogen atom to the epoxide group, with formation of a hydroxyl group.

Unsaturated polyester resins are used preferably as base polymers for adhesives. They are obtained by polycondensation of unsaturated and saturated dicarboxylic or polycarboxylic acids with alcohols. Given a suitable reaction regime, the double bonds remain in the acid and/or alcohol and permit polymerization reactions with unsaturated monomers, styrene for example. Unsaturated dicarboxylic acids used with preference are as follows: maleic anhydride, maleic acid, fumaric acid.

Saturated dicarboxylic acids used with preference are as follows: ortho-phthalic acid and ortho-phthalic anhydride, isophthalic acid, terephthalic acid, tetrahydrophthalic acid, hexahydrophthalic acid, adipic acid, azelaic acid, sebacic acid, hexachloroendomethylenetetrahydrophthalic acid, tetrabromophthalic acid.

Glycols used with preference are as follows: propylene 1,2-glycol, ethylene glycol, butylene glycol, neopentyl glycol, 2,2,4-trimethylpentane-1,3-diol, dibromoneopentyl glycol, diethylene glycol, triethylene glycol, dipropylene glycol, pentaerythritol diallyl ether, dicyclopentadiene.

Monomers for the crosslinking used with preference are as follows: styrene, alpha-methylstyrene, meta- and para-methylstyrene, methyl methacrylate, diallyl phthalate, triallyl cyanurate.

This listing does not exhaust the number of possible starting materials. The skilled person will be able, depending on the raw material situation, to use other compounds as well. Furthermore, the addition of dicyclopentadiene is customary, and the reactivity of the resins is modified as a result. The "unsaturated polyester resins" produced can be used as such or in dilution with reactive monomers. Reactive monomers are styrene, stilbene, esters of acrylic acid, esters of methacrylic acid, diallyl phthalate, and other unsaturated compounds, provided that they have a sufficiently low viscosity and adequate miscibility with the unsaturated polyester resin.

Polyurethane resins are used preferably as base polymers for adhesives. The polyurethanes are derived from isocyanic acid. As an extremely reactive compound, it undergoes addition very readily with compounds which possess an active hydrogen atom. In the course of this reaction the double bond between the nitrogen and the carbon is cleaved, the active hydrogen becoming attached to the nitrogen and the oxygen-containing radical to the carbon, to form a urethane group. In order to obtain higher molecular mass crosslinked polyurethanes of the kind needed for adhesive and sealant layers, it is necessary to provide reaction partners which are starting products having at least two functional groups, such as di- or triisocyanates, for example diphenylmethane 4,4-diisocyanate (MDI) with polymeric fractions, or reaction product of tolylene diisocyanate (TDI) and polyols, and polyhydric alcohols (diols or polyols, compounds having two or more hydroxyl functions in the molecule). Alcohols of this kind may also be present, for example, in the form of saturated polyesters, which are prepared with an excess of polyalcohols.

Two-component reactive adhesives are composed of a low molecular mass polyisocyanate and a likewise relatively low molecular mass polyesterpolyol, for example polyalkylene polyadipate. Following the combining of the two components, urethane groups are formed in the adhesive or in the adhesive layer.

One-component reactive adhesives are composed of a relatively high molecular mass polyurethane, which sets by reacting with atmospheric moisture. In principle the situation here as well is one of two inter-reacting chemical components, but only one physical component is supplied for adhesive processing. Since, on reaction with moisture, the simple low molecular mass polyisocyanates form relatively hard and brittle adhesive layers with low strength values, the one-component systems start from precrosslinked polymers, known as prepolymers. These compounds are prepared from relatively high molecular mass polyols with a stoichiometric excess of isocyanate. In this way, the compounds present already possess urethane bonds, but in addition possess reactive isocyanate groups as well, which are amenable to the reaction with moisture. The reaction with water proceeds with the formation of a urea bond. The primary amines formed in the course of the decomposition reaction react immediately with further isocyanate groups to form polyureas. In the case of the one-component systems, therefore, the fully cured polymer contains not only urethane compounds but also urea compounds.

Solvent-borne polyurethane adhesives are available as physically setting systems and as chemically reacting systems. In the case of the physically setting systems the polymer takes the form of a high molecular mass hydroxyl polyurethane, the solvent used being, for example, methyl ethyl ketone. The chemically reacting systems include additionally hydroxyl polyurethane and a further polyisocyanate as crosslinker and as a second component.

Dispersion-based adhesives comprise a high molecular mass polyurethane in dispersion in water.

In the case of thermally activable polyurethane adhesives the isocyanate component is in "capped" or "blocked" form in a compound which eliminates the isocyanate component only at a relatively high temperature.

Reactive polyurethane hotmelt adhesives are prepared by using relatively high molecular mass, crystallizing and meltable diol and isocyanate components. These components are applied as hotmelt adhesives at temperatures from around 70° C. to 120° C. to the adherends. After cooling, the bond acquires a sufficient initial strength, which allows rapid further processing. Subsequently, as a result of additional moisture exposure of the reactive isocyanate groups still present, crosslinking then takes place via urea bonds, to form the adhesive layer polymer.

Silane-terminated polymers are used preferably as base polymers for adhesives.

The term "silane-terminated polymers" or else "silane-modified polymers" embraces all of those prepolymers which, either at the chain ends or pendently, carry silyl groups having at least one hydrolysable bond, but whose polymer backbone does not contain the siloxane bond typical of siloxanes.

In general it can be assumed that any silane-modified polymer, irrespective of its chemical structure, will have the qualities of a hybrid: the curing is similar to that of the silicones, and the other properties are shaped by the various possible polymer backbones between the silyl groups. Silane-terminated or silane-modified polymers can be classed in terms of their structure between the polyurethanes and the silicones.

The synthesis of the silane-modified polymer encompasses a number of stages. The initial basis is dihydric or trihydric polyoxypropylene glycol, which is converted into the corresponding bisallyl compound. That compound is reacted to form the desired end product, bis(3-(methyldimethoxysilyl)propyl)polyoxypropylene.

The silyl groups thereby introduced into the chains crosslink with one another via mechanisms of the kind known in silicone chemistry, i.e., with elimination of small amounts of water or methanol, and so give an elastic and insoluble network.

There are further possible methods of obtaining sealants and adhesives based on silicone-modified polymers: for example, the reaction of NCO-terminated prepolymers with correspondingly reactive aminosilanes or mercaptosilanes. The polymer backbone may contain all of the only conceivable rational structural elements, such as ether, ester, thioether or disulphide bridges. The converse case, in which an $NH_2$—, SH— or OH-terminated prepolymer can be reacted with an isocyanate silane, is likewise conceivable. The addition of terminal mercapto groups either in the prepolymer or in the silane to C—C double bonds offers a further route of technical interest.

Vinyl ester resins are used preferably as base polymers for adhesives. On the chemical side, vinyl ester resins possess a certain relationship to the UP resins, in particular as far as curing reaction, processing technology and field of use are concerned. These resins are polyadducts of liquid epoxy resins and acrylic acid. As a result of reduction of ester groups in the molecule chain, these resins have better hydrolysis resistance in tandem with effective elasticity and impact toughness. Monomers used for crosslinking are the same as for the unsaturated polyester resins, styrene in particular.

Acrylates are used preferably as base polymers for adhesives. The collective term "acrylate-based adhesives" encompasses all of the reactive adhesives whose curing takes place via the carbon-carbon double bond of the acrylic group.

Particular significance in adhesive formulations has been acquired by the methacrylic esters and the alpha-cyanoacrylic esters. The curing of the acrylate adhesives is accomplished by addition polymerization, in the course of which an initiator triggers a chain reaction leading to a continuous curing of adhesive. The polymerization of the "acrylate" adhesives can be initiated by means of free radicals or alternatively, in the case of the alpha-cyanoacrylates, by means of anions. In accordance with the polymerization mechanism that is utilized for curing, the acrylate adhesives are also subdivided into the following groups:

anionically curing adhesives: alpha-cyanoacrylate 1-component adhesives, free-radically curing adhesives: anaerobic 1-component adhesives, free-radically curing adhesives: 2-component adhesives In the case of the sealants based on polyacrylic esters or acrylic ester copolymers and polymethacrylic esters a distinction is made between solvent-borne and aqueous systems. Polyacrylate sealants cure physically by evaporation of the solvent or of the dispersion water.

Polyvinyl acetates are used preferably as base polymers for adhesives. Polyvinyl acetate is the product of polymerization of vinyl acetate. Owing to the strongly polar acetate group present in the molecule, polyvinyl acetate possesses very good adhesion properties to many adherend surfaces. Use is predominantly as a dispersion-based adhesive with a solids content of approximately 50% to 60%, in some cases also based on vinyl acetate copolymers (with vinyl chloride, for example).

Polyvinyl alcohols are used preferably as base polymers for adhesives.

Polyvinyl alcohol comes about as a product of hydrolysis of polyvinyl acetate and other similar polyesters. Depending on molecular weight, the polyvinyl alcohol takes the form of a liquid having a more or less high viscosity. It is used, for example, for bonding cellulosic materials, such as paper, cardboard, wood, etc., for example, and also as a protective colloid for stabilizing and increasing the setting rate of dispersion-based adhesives.

Polyvinyl ethers are used preferably as base polymers for adhesives. Among the polyvinyl ethers, the following three polymers in particular are of interest as base materials for adhesives: polyvinyl methyl ethers, polyvinyl ethyl ethers, polyvinyl isobutyl ethers.

The polyvinyl ethers at moderate degrees of polymerization are tacky plasticizing resins possessed of very good adhesion properties to porous and smooth surfaces. Polyvinyl methyl ether is notable in particular for the fact that, owing to its water-solubility, it can be moistened again and therefore, for example, as a mixture with dextrin or animal glues, used as a gum on label papers, endows them with improved adhesion. On account of their permanent tackiness, polyvinyl ethers are also employed in pressure-sensitive adhesives.

Ethylene-vinyl acetates, a copolymer of ethylene and vinyl acetate, are used preferably as base polymers for adhesives. In the molecular structure the vinyl acetate molecules are incorporated randomly in the ethylene chain. While the elimination of acetic acid makes the polyvinyl acetate relatively unstable under temperature load, the copolymers with ethylene are significantly more resistant in terms of oxidation and thermal degradation. For this reason, EVA copolymers with an approximately 40% vinyl acetate fraction are among an important group of base hotmelt adhesive materials.

Ethylene-acrylic acid copolymers are used preferably as base polymers for adhesives. They are copolymers of ethylene and of acrylic acid and/or acrylic esters.

These copolymers, which combine the chemical resistance of polyethylene with the good properties of the acid and/or ester moiety, represent important base polymers for hotmelt adhesives. The ester component used is preferably ethyl acrylate.

Polyvinylacetals are used preferably as base polymers for adhesives. Polyvinylacetals come about through the action of aldehydes on alcohols. The most important acetals for adhesives manufacture are polyvinylformal and polyvinylbutyral. Both serve as a plasticizing component for phenolic resin-based adhesives. Polyvinylbutyral, moreover, finds application as an adhesive film in laminated safety glass.

Polystyrenes are used preferably as base polymers for adhesives. The monomer is in use as a constituent for adhesive base materials predominantly in two areas: as a copolymer with plasticizing monomers, particularly butadiene, for the preparation of styrene-butadiene dispersions; and as a "polymerizable" solvent for copolymerization with unsaturated polyesters.

Polyvinyl chloride is used preferably as base polymer for adhesives. It is used more particularly for plastisol adhesives, and also as a copolymer with vinyl acetate to give vinyl chloride/vinyl acetate copolymers in solvent-based adhesives, dispersion-based adhesives, heat-sealing adhesives, and as a high-frequency welding assistant.

Styrene-butadiene rubber is used preferably as base polymer for adhesives. Styrene-butadiene rubber is a typical example of a thermoplastic elastomer, combining the application properties of elastomers with those of thermoplastics. The styrene-butadiene copolymer (SBS) and the styrene-isoprene copolymer (SIS) are what are called triblock copolymers, constructed linearly of successive identical monomer units in individual blocks. The end blocks are polystyrene segments, while the middle block is polybutadiene (styrene-butadiene-styrene block copolymer, SBS) or else isoprene (styrene-isoprene-styrene block polymer, SIS).

The ratio of styrene fraction to butadiene fraction or of styrene fraction to isoprene fraction is approximately 1:3. Unlike adhesive layer polymers which owe their elastic properties to the addition of plasticizer, in this way an "internal plasticizing" is achieved. A particular advantage of these rubber copolymers is their ability to form adhesive layers having good adhesion properties and high flexibility. Significant application therefore exists in situations where the adhesively bonded adherends are subject in practical use to high deformation stresses, such as in footwear or with rubber/rubber or rubber/metal bonds, for example.

Chloroprene rubber (CR) is used preferably as base polymer for adhesives. Chloroprene rubber comes about as a polymerization product and copolymerization product of chloroprene (2-chlorobutadiene). Besides the good adhesion properties, the linear macromolecules possess a strong propensity towards crystallization, which contributes to a relatively high strength on the part of the adhesive layer. These polymers and copolymers are important base materials for contact adhesives. The double bond present within the polychloroprene molecule allows additional crosslinking to be carried out with correspondingly reactive molecule groups. Thermosetting components used for this purpose include isocyanates and phenolic resins.

Nitrile rubber (NBR) is used preferably as base polymer for adhesives. Nitrile rubber is a copolymer of butadiene with a fraction of approximately 20% to 40% of acrylonitrile. The high acrylonitrile fraction endows these polymers with effective plasticizer resistance, so making them highly suitable, for example, for the bonding of plasticized plastics.

Butyl rubber is used preferably as base polymer for adhesives. Butyl rubber is a copolymer composed of a predominant fraction of isobutylene with isoprene. Within this linear chain molecule there exist, in the form of the long polyisobutylene segments, very high chain fractions of saturated character, at which no further crosslinking is possible. The sole crosslinkable component is the isoprene molecule, and so the overall properties of the butyl rubber are determined by the fraction of the number of double bonds, predetermined by the isoprene. The reactivity can be further influenced by incorporation of monomers containing chlorine or bromine.

Polysulphides are used preferably as base polymers for adhesives. Raw materials for polysulphide sealants have long been known under the trade name Thiokol®. Polysulphide polymers are obtained by reacting dichloroethylformal with sodium polysulphide. The molecular weight of the liquid polymers is between 3000 and 4000. By reaction with an oxidizing agent, manganese dioxide for example, they can be converted into an ultimate rubber-elastic state.

Polyethylenes are used preferably as base polymers for adhesives. The low molecular mass types, with melt indices in the range from 2 to 2000 g/10 min, have found use, in combination with tackifying resins and microwaxes, as hotmelt adhesives in the paper and cardboard industry.

Polypropylenes are used preferably as base polymers for adhesives. Polypropylene is in use as a base material for hotmelt adhesives with moderate strength properties, more specifically in the form of atactic polypropylene.

Fluorinated hydrocarbons are used preferably as base polymers for adhesives. Polyfluoro-ethylene-propylene is a copolymer of tetrafluoroethylene and hexafluoropropylene and has been studied as a base material for hotmelt adhesives. The advantage of these products lies in the high long-term temperature durability.

Polyamides are used preferably as base polymers for adhesives. The polyamides represent some of the most important base materials for the physically setting hotmelt adhesives. Suitable for the preparation of the polyamides are the reactions described below, which typically take place in the melt under a nitrogen atmosphere: polycondensation of diamines with dicarboxylic acids; polycondensation of aminocarboxylic acids; polycondensation from lactams; polycondensation of diamines with dimerized fatty acids.

Saturated polyesters and copolyesters are used preferably as base polymers for adhesives. Saturated polyesters and copolyesters come about through polycondensation from dicarboxylic acids and diols. They are an important base material for hotmelt adhesives.

Phenol-formaldehyde resins are used preferably as base polymers for adhesives. These polymers come about through a polycondensation reaction between phenol and formaldehyde, forming highly crosslinked phenolic resins which are used as a base material for adhesives for—for example— aircraft construction. Pure phenol-formaldehyde resins are generally too brittle. For this reason they are modified with thermoplastic polymers by copolymerization or cocondensation, for example with polyvinylformal, polyvinylbutyral, polyamides, epoxy resins or elastomers, for example polychloroprene and nitrile rubber.

Cresol-/resorcinol-formaldehyde resins are used preferably as base polymers for adhesives. Besides phenol as a starting monomer for formaldehyde condensations, use is also made of phenol derivatives, such as cresols and resorcinol, as co-reactants.

Urea-formaldehyde resins are used preferably as base polymers for adhesives. A large number of nitrogen-containing organic compounds are capable of polycondensation with aldehydes. For application as adhesives, urea and melamine in particular have acquired importance. With the urea-formaldehyde resins the reaction sequence takes place initially in the form of an addition reaction in weakly acidic solution. The actual polycondensation reaction, leading to the formation of the polymeric adhesive layer, results in highly crosslinked polymers via the formation either of an ether bridge or of a methylene bridge.

Melamine-formaldehyde resins are used preferably as base polymers for adhesives. Like urea, melamine as well reacts with formaldehyde to form methylol compounds. As in the case of the urea reactions, the polycondensation with these compounds too proceeds via methylene or methylene ether linkages to form high molecular mass, highly crosslinked, hard and in some cases brittle adhesive layers.

Polyimides are used preferably as base polymers for adhesives. The experiments on the use of the polyimides arise out of the concern to have organically based adhesives available for high temperature challenges. The preparation of technically utilizable polyimides is accomplished by reaction of the anhydrides of tetrabasic acids, for example pyromellitic anhydride, with aromatic diamines, for example diaminodiphenyl oxide. Use as an adhesive is accomplished starting from a precondensate, in the form of solutions or films.

Polybenzimidazoles are used preferably as base polymers for adhesives.

The polybenzimidazoles are likewise to be classed as adhesives of high heat resistance. They come about through a polycondensation reaction from aromatic tetramines with dicarboxylic acid.

Polysulphones are used preferably as base polymers for adhesives. The polysulphones likewise belong to the group of heat-resistant adhesives. They are obtained, for example, through a polycondensation reaction from dihydroxydiphenyl sulphone with bisphenol A.

It was surprising that the silicas described could be incorporated into the adhesives of the invention and exhibit a very high level with regard to the viscosity in conjunction with improved long-term performance.

The examples which follow are intended to elucidate the invention in greater detail.

EXAMPLES

Thickening action: the thickening action (in mPas) is determined in a dispersion of the silicon dioxide powder in an unsaturated polyester resin, such as cocondensates of ortho- or meta-phthalic acid and maleic or fumaric acid, or their anhydrides, and a low molecular mass diol, such as, for example, ethylene glycol, 1,2- or 1,3-propanediol, 1,2-, 1,3- or 1,4-butanediol or neopentylglycol $((CH_3)_2C(CH_2OH)_2)$, or polyols, such as pentaerythritol, preferably in solution at 30% to 80% by weight, preferably 60% to 70% by weight, in an olefinic reactive diluent as solvent, such as monostyrene, for example. The viscosity of the polyester resin is 1300+/− 100 mPas at a temperature of 22° C. 7.5 g of silicon dioxide powder are added to 142.5 g of polyester resin at a temperature of 22° C. and dispersed by means of a dissolver at 3000 $min^{-1}$. 60 g of this dispersion are admixed with a further 90 g of the unsaturated polyester resin, and the dispersing operation is repeated.

The thickening action is the viscosity figure in mPas of the dispersion at 25° C., measured using a rotational viscometer with a shear rate of 2.7 $s^{-1}$. An example of a suitable unsaturated polyester resin is Ludopal® P6, BASF.

Example 1

Preparation of the Hydrophilic Silicon Dioxide Powder 100 kg/h of silicon tetrachloride are vaporized and transferred into the mixing chamber of a burner. At the same time, 53 $Nm^3/h$ of hydrogen and 155 $Nm^3/h$ of primary air are introduced into the mixing chamber. The temperature of the mixture is 90° C. It is ignited and burnt in a flame into a reaction chamber. Additionally 55 $Nm^3/h$ of secondary air, which surrounds the flame, are introduced into the reaction chamber.

The reaction gases and the silicon dioxide formed are drawn through a cooling system by the application of an underpressure, and cooled to levels of between 100 and 160° C. In a filter or cyclone, the solid is separated from the outgoing gas stream and subsequently treated with steam at a temperature of 450° C.

TABLE

Preparation of the hydrophilic silicas

| Example | | Inventive silica AE 175 | Comparative example AEROSIL 150 |
|---|---|---|---|
| Silicon tetrachloride | kg/h | 100 | 100 |
| Hydrogen | Nm³/h | 53 | 35 |
| Primary air | Nm³/h | 155 | 95 |
| Secondary air | Nm³/h | 55 | 45 |
| Secondary air/ primary air | | 0.35 | 0.21 |
| Entry temperature(*) | ° C. | 90 | 90 |
| $V_{burner}{}^{+)}$ | m/s | 43.9 | 28.0 |
| Adiabatic flame temperature$^{++)}$ | ° C. | 1871 | 1886 |

(*)For mixture of $H_2$, primary air and $SiCl_4$
$^{+)}$Exit velocity from burner for mixture of $H_2$, primary air and $SiCl_4$
$^{++)}$For mixture of $H_2$, primary air and $SiCl_4$

TABLE

Physicochemical data of the hydrophilic silicas

| Example | | Inventive silica as per Example 1 | Comparative example AEROSIL 150 |
|---|---|---|---|
| BET surface area | m²/g | 179 | 152 |
| pH | | 4.0 | 4.3 |
| Tapped density | g/l | 55 | 51 |
| Thickening | mPas | 3596 | 2445 |

The inventive silica as per Example 1 exhibits a thickening action relative to the surface area of
20.08 mPas·g./. m².
The comparison silica AEROSIL 150 exhibits a thickening action relative to the surface area of
16.08 mPas·g./. m².

Example 2 (Comparative Example)

Preparation of the Hydrophobic Comparison Silica 2 kg of AEROSIL® 150 were introduced in a mixer and sprayed with mixing with 0.42 kg of Rhodorsil oil 47 V 100 (polydimethylsiloxane) by means of a two-fluid nozzle. After the end of spraying, mixing was carried out for 15 minutes and the reaction mixture was then heat-treated at 360° C. for 3 hours under a nitrogen atmosphere.

Example 3 (Inventive)

Preparation of the Hydrophobic Inventive Silica 2 kg of AEROSIL 175 as per Example 1 were introduced in a mixer and sprayed with mixing with 0.62 kg of Rhodorsil oil 47 V 100 (polydimethylsiloxane) by means of a two-fluid nozzle. After the end of spraying, mixing was carried out for 15 minutes and the reaction mixture was then heat-treated at 360° C. for 3 hours under a nitrogen atmosphere.

TABLE 1

Physicochemical data

| Designation | Comparison silica | Inventive silica |
|---|---|---|
| Tapped density [g/l] | 67 | 64 |
| Loss on drying [%] | 0.1 | 0.2 |
| Loss on ignition [%] | 4.4 | 5.3 |
| pH | 5.8 | 6.2 |
| C content [%] | 4.6 | 5.6 |
| BET specific surface area [m²/g] | 95 | 110 |
| Heptane extractables [%] | 5.5 | 5.5 |
| Average aggregate surface area [nm²] | 46 710 | 53 257 |
| Average ECD [nm] | 206 | 197 |
| Average aggregate circumference [nm] | 2870 | 3605 |
| Convex aggregate circumference [nm] | 1077 | 1053 |
| Difference between average aggregate circumference and convex aggregate circumference [nm] | 1793 | 2552 |
| Average max. aggregate Ø [nm] | 404 | 394 |
| Average min. aggregate Ø [nm] | 243 | 242 |
| Degree of branching | 19 | 14 |
| Average primary particle Ø [nm] | 19 | 18 |

AEROSIL® 150 is a hydrophilic fumed silica having a specific surface area of 150 m²/g which exhibits the following physicochemical data (see Table 2):

TABLE 2

| Properties | Unit | Guide values |
|---|---|---|
| Specific surface area (BET) | m²/g | 150 ± 15 |
| Average primary particle size | Nm | 14 |
| Tapped density (approximate figure)* by method based on DIN EN ISO 787/11, August 1983 | g/l | about 50 |
| Loss on drying* 2 h at 105° C. | % by weight | <1.5 |
| Loss on ignition 2 h at 1000° C., based on the dried substance (2 h at 105° C.) | % by weight | <1.0 |
| pH 4% dispersion | | 3.7-4.7 |
| $SiO_2$ content, based on the calcined substance | % by weight | >99.8 |

The inventive hydrophobic fumed silica is used in epoxy resin.
Therein it exhibits a super-proportional thickening behaviour (see Example 4).

Example 4

Rheological Properties

The rheological properties are determined for the inventive pyrogenic silica used, as per Example 3, and the comparison silica, in the epoxy resin Renlam M1 (Huntsman). In this case the viscosities are measured before and after addition of the curing agent.
The rheological properties are determined by the method described below.
A) Formulation
64.42% Renlam M1 (low-viscosity epoxy resin from Huntsman)

3.85% silica 28.85% Aradur 250 (low-viscosity polyaminoamide, curing agent from Schering)

2.88% Accelerator 960-1CH (tertiary amine, curing accelerant from Ciba-Geigy)

B) Preparation of the Base Mixture

In a 350 ml beaker, 167.5 g of Renlam M1 and 10 g of silica are weighed out and the dissolver disc is fully immersed. Then the silica is homogenized at a speed n1=1000 rpm, with the lid closed, until it is fully incorporated. As soon as the silica is fully incorporated, the speed is increased to n2=3000 rpm and dispersion takes place under reduced pressure for 3 minutes.

C) Preparation of the Curing Agent Mixture 75.0 g of Aradur 250 and 7.5 g of Accelerator 960-1 are weighed out into a 180 ml beaker and homogenized with a spatula for 1 minute. The mixture is then deaerated in a vacuum cabinet and stored in a water bath at 25° C. for at least 90 minutes.

D) Preparation of the Mixture for Crosslinking

The base mixture (176.5 g) and the curing agent mixture (82.5 g) are introduced into a 350 ml beaker and homogenized with a spatula for 1 minute. There must be no bubbles formed.

E) Implementation of the Measurements

E1) Determination of the Viscosities Before Addition of Curing Agent

The base mixture is introduced into the 180 ml beaker until it is almost full. Without delay, the measuring head of the rheometer is immersed fully into the mixture, and measurement takes place as follows:

| 2.5 rpm | value read off after 60 s |
| 20 rpm | value read off after 30 s |

E2) Determination of the Viscosities after Addition of Curing Agent

The prepared mixture is introduced into a 180 ml beaker until it is almost full. Without delay, the measuring head of the rheometer is immersed fully into the mixture, and measurement takes place as follows:

| 2.5 rpm | value read off after 60 s |
| 20 rpm | value read off after 30 s |

E3) Determination of the Viscosities in the Course of Curing

The measurement described above is repeated after 15, 30, 45 minutes (and so on until curing begins). In each case the temperature of the mixture is determined 1 minute prior to the beginning of the measurement.

E4) Viscosity

The value is read off by the viscosities [Pa*s] at the respective rpm.

The viscosity is determined using a Brookfield DV III rheometer. The viscosity values reported were obtained at room temperature, 25° C. Measurement prior to the addition of curing agent is made using spindle 7, and after the addition of curing agent using spindle 6.

Table 3 shows the results.

TABLE 3

| Composition | | Spindle | Viscosity (mPa s) | |
| --- | --- | --- | --- | --- |
| | | | 2.5 rpm | 20 rpm |
| Comparison silica, Example 2 | Before addition of curing agent | 7 | 401 600 | 79 400 |
| After addition of curing agent | | 6 | 52 800 | 11 450 |
| 15 min | | 6 | 52 000 | 10 850 |
| 30 min | | 6 | 49 200 | 10 150 |
| 45 min | | 6 | 51 600 | 10 100 |
| Inventive silica, Example 3 | Before addition of curing agent | 7 | 489 600 | 95 000 |
| After addition of curing agent | | 6 | 76 400 | 15 650 |
| 15 min | | 6 | 71 600 | 14 150 |
| 30 min | | 6 | 69 600 | 13 550 |
| 45 min | | 6 | 72 000 | 13 550 |

Table 3 shows that the viscosity of the comparison silica of Example 2 is lower on addition to the epoxy resin. In comparison, the addition of the inventive silica of Example 3 produces a distinct increase in the viscosity of the epoxy resin, and even after the addition of curing agent the viscosity remains at a higher level overall.

In an experimental procedure modified slightly from the above procedure, the storage stability is monitored over time from the viscosity profile.

F) Formulation 201.92 g (92.15%) Renlam M1 (low-viscosity epoxy resin from Huntsman)

8.08 g (3.85%) silica

G) Procedure 201.92 g (92.15%) of Renlam M1 and 8.08 g (3.85%) of silica are weighed out into a 350 ml PE beaker.

The dissolver disc is immersed down to the centre of the beaker and the sample is homogenized at 1000 rpm.

In this case the beaker is closed with the perforated lid in order to prevent the silica escaping as dust.

As soon as the silica is fully incorporated, the disc is immersed down to 10 mm above the base of the beaker, and dispersion takes place at a speed of 3000 rpm for 3 minutes, accompanied by deaeration under reduced pressure.

The dispersed sample is transferred to a 250 ml glass bottle.

The sample is stored in a water bath at 25° C. for 90 minutes.

H) Measurement after 0 and 7 Days

After 90 minutes the sample is agitated with a spatula for 1 minute and then its viscosity is determined using the Brookfield DV III. Following the measurement, the samples are stored in a drying cabinet at 50° C. for 7 days.

After 7 days, the sample is heat-treated in a water bath at 25° C. for 1 minute, agitated with the spatula and again measured using the Brookfield.

I) Implementation of the Measurement with Brookfield

The spindle of the Brookfield rheometer is immersed down to the mark, with measurement taking place as follows:

I 1:

5 rpm—value read off after 60 seconds 50 rpm—value read off after 30 seconds

I 2:

2.5 rpm—value read off after 60 seconds 20 rpm—value read off after 30 seconds

J) Evaluation

The measurements after 0 and 7 days are compared with one another.

TABLE 4

| Sample | Spindle | 0 days measurement Viscosity (mPas) | | 7 days measurement Viscosity (mPas) | |
|---|---|---|---|---|---|
| | | 5 rpm | 50 rpm | 5 rpm | 50 rpm |
| Comparison silica Example 2 | 6 | 68 600 | 14 840 | 49 800 | 11 560 |
| Inventive silica Example 3 | 6 | 88 400 | 16 800 | 69 200 | 15 340 |

TABLE 5

| Sample | Spindle | 0 days measurement Viscosity (mPas) | | 7 days measurement Viscosity (mPas) | |
|---|---|---|---|---|---|
| | | 2.5 rpm | 20 rpm | 2.5 rpm | 20 rpm |
| Comparison silica Example 2 | 6 | 118 400 | 26 150 | 80 000 | 19 300 |
| Inventive silica Example 3 | 6 | 138 400 | 28 750 | 115 600 | 26 250 |

The results in Tables 4 and 5 show that the inventive silica of Example 3 exhibits a much higher viscosity than the comparison silica of Example 2, a viscosity which, even after storage, is much higher by comparison.

The invention claimed is:

1. A process for preparing a fumed hydrophilic silicon dioxide powder comprising aggregated primary particles having a BET surface area of 175±15 m²/g, wherein a thickening effect of the powder, based on the BET surface area, is greater than 18 mPas·g/m², the process comprising:
    vaporizing a silicon compound;
    transferring the vaporized silicon compound, optionally with a carrier gas, into a mixing chamber,
    separately, transferring a fuel gas and primary air into the mixing chamber, and mixing with the silicon compound vapour;
    igniting the mixture in a burner wherein a flame is burnt into a reaction chamber;
    introducing secondary air surrounding the flame into the reaction chamber;
    separating solid silicon dioxide from gaseous substances; and
    treating the separated solid with a steam at 250° C. to 750° C.,
    wherein
    the primary air is optionally preheated or enriched with oxygen,
    a ratio of secondary air/primary air is from 0.05 to 3,
    a total amount of oxygen is at least sufficient for the complete combustion of the fuel gas and the silicon compound, and
    an adiabatic flame temperature $T_{ad}$ is from 1840 to 1900° C., wherein $T_{ad}$=temperature of feedstocks+sum of the reaction enthalpies of the sub-reactions/heat capacity of the substances which depart from the reaction chamber, comprising silicon dioxide, water, hydrogen chloride, carbon dioxide, oxygen, nitrogen and, a carrier gas, if the latter is not air or nitrogen, on the basis of the specific heat capacity of these substances at 1000° C.

2. The process as claimed in claim 1, wherein the silicon compound is $SiCl_4$, and the fuel gas is $H_2$.

3. The process as claimed in claim 2, wherein for 100 kg/h of $SiCl_4$ transferred to the mixing chamber, 53 Nm³/h of $H_2$, 155 Nm³ of primary air and 55 Nm³ of secondary air are employed.

4. The process as claimed in claim 2, wherein the secondary air/primary air ratio is 0.35.

5. The process as claimed in claim 1, wherein the thickening effect relative to the surface area of the powder is 20.08 mPas·g/m².

6. A hydrophobic fumed silica, wherein
    a BET surface area is 110±25 m²/g,
    an average aggregate surface area is 53 257±500 nm²,
    an average aggregate circumference is 3605±500 nm,
    an average maximum aggregate diameter is 394±5 nm,
    an average minimum aggregate diameter is 242±5 nm, and
    an average primary particle diameter is 18±5 nm,
    wherein
    the hydrophobic fumed silica is obtained by a process comprising:
    spraying the hydrophilic fumed silica obtained by the process according to claim 1 with polydimethylsiloxane, followed by mixing and then heat treatment for 1 to 6 hours.

7. The hydrophobic fumed silica according to claim 6, wherein the heat treatment is conducted at 360° C. for 3 hours under a nitrogen atmosphere.

8. An adhesive composition which comprises the hydrophobic fumed silica according to claim 6 and an epoxy resin.

9. An epoxy resin composition comprising the hydrophobic fumed silica according to claim 6.

10. A method to adhere two surfaces comprising applying the epoxy resin composition according to claim 9 to at least one of the two surfaces.

* * * * *